2,839,591

PREPARATION OF m- AND p-DIISOPROPYLBENZENE BY ISOMERIZING DIISOPROPYLBENZENES IN THE PRESENCE OF ALUMINUM CHLORIDE

Herman I. Enos, Jr., Wilmington, Del., assignor to Hercules Powder Company, Wilmington, Del., a corporation of Delaware No Drawing. Application June 29, 1953
Serial No. 364,961

7 Claims. (Cl. 260—668)

This invention relates to the preparation of m-diisopropylbenzene and more particularly to the preparation of m-diisopropylbenzene and p-diisopropylbenzene from isomeric diisopropylbenzenes.

m-Diisopropylbenzene has recently become of interest as a raw material for the manufacture of m-isopropylphenol, resorcinol, isophthalic acid, and related compounds. Its presence in prior art mixed diisopropylbenzenes has long been recognized. However, it has been separated from such mixed diisopropylbenzenes only by a tedious combination of distillation, fractional crystallization, adsorption, sulfonation, and hydrolysis of the sulfonates. A more practical separation is now desired. The reason for the difficulty in separating a pure m-diisopropylbenzene from a mixture by distillation is not disclosed in the prior art. As disclosed in copending application, Serial No. 364,941, filed June 29, 1953, and now abandoned, this has now been shown to be due to the presence of o-diisopropylbenzene and trimethylindane which distill in substantially the same temperature range. A process for preparing a mixture of m- and p-diisopropylbenzenes substantially free of o-diisopropylbenzene and trimethylindane has been described and claimed in copending application, Serial No. 364,941, filed June 29, 1953, and now abandoned.

Now in accordance with the present invention, it has been found that m-diisopropylbenzene can be made from and separated from o-diisopropylbenzene and from p-diisopropylbenzene by contacting o- or p-diisopropylbenzene, individually or in admixture with any of the isomeric diisopropylbenzenes, but in the absence of trimethylindane, in an isomerization reaction with 0.1 to 2 mole percent of the reaction mixture of aluminum chloride at a temperature in the range of about 65–115° C. until a mixture substantially free of o-diisopropylbenzene and trimethylindane is obtained and fractionally distilling m-diisopropylbenzene from the resulting mixture of diisopropylbenzenes and by-products of the reaction.

The raw material for the process is o-diisopropylbenzene or p-diisopropylbenzene or a mixture of diisopropylbenzenes. This is exclusive of recycled by-products. The raw material must be substantially free of trimethylindane which boils in the same temperature range as m-diisopropylbenzene. The raw material will generally be a mixture of isomeric diisopropylbenzenes containing all three isomers in varying proportions. Recycled by-products will include benzene, cumene, and polyisopropylbenzenes.

The process as carried out generally involves re-use of the other products of the reaction which are separated in the distillation process and are recycled to the isomerization step. Thus benzene and cumene which result from disproportionation are returned to the cycle along with the higher boiling triisopropylbenzene. After the reaction is in progress, the amounts of each of these recycled by-products becomes substantially constant. The m-diisopropylbenzene fraction boils above that of cumene and below that of p-diisopropylbenzene. The p-diisopropylbenzene fraction is likewise recycled. However, if desired, this fraction can also be separated in substantially pure form and the process does not depend upon its being recycled.

The process is generally carried out by mixing the aluminum chloride with the diisopropylbenzene at a temperature below the 65–115° C. range, and then raising the temperature to the 65–115° range and maintaining the temperature in this range until a mixture rich in m-diisopropylbenzene and substantially free of o-diisopropylbenzene is obtained. The catalyst is then removed in a manner generally used for removing aluminum chloride catalysts as by adding the reaction mixture to water preferably containing mineral acid or caustic to dissolve the aluminum hydroxide. After separating from the aqueous layer, and removal of water by a water-removing agent or distillation, the reaction product is fractionally distilled to separate m-diisopropylbenzene from the benzene, cumene, p-diisopropylbenzene, triisopropylbenzene, and higher boiling tetraisopropylbenzene. The mole percents of these products as obtained from a diisopropylbenzene mixture containing o-, m-, and p-diisopropylbenzene by isomerization for up to about one hour, at which time equilibrium was approached, are shown in Table 1.

*Table 1*

| Components at Equilibrium | Mole Percent at T.° C. | |
|---|---|---|
| | 80° C. | 100° C. |
| Benzene | 2.0 | 2.0 |
| Cumene | 18.5 | 18.5 |
| m-Diisopropylbenzene | 37.2 | 37.2 |
| p-Diisopropylbenzene | 18.6 | 18.6 |
| Triisopropylbenzene | 21.0 | 21.0 |
| Tetraisopropylbenzene | 0.6 | 0.6 |

In continuing the process with recycle of by-products, the m-diisopropylbenzene fraction is separated and all of the other fractions are recycled to the isomerization reaction along with an amount of diisopropylbenzene equal to the amount of m-diisopropylbenzene withdrawn from the system. If desired, the p-diisopropylbenzene fraction may also be separated for other uses and mixed isomers of diisopropylbenzene may be recycled to the isomerization step in its place. Thus, the process is a cyclic one in which diisopropylbenzene isomers are converted to a mixture containing m- and p-diisopropylbenzene isomers which can be separated in substantially pure form by fractional distillation, the diisopropylbenzene isomers being introduced at one end of the cycle and the desired pure isomers being withdrawn at the other end of the cycle.

The process including the various recycle steps in expressed by the following flow sheet:

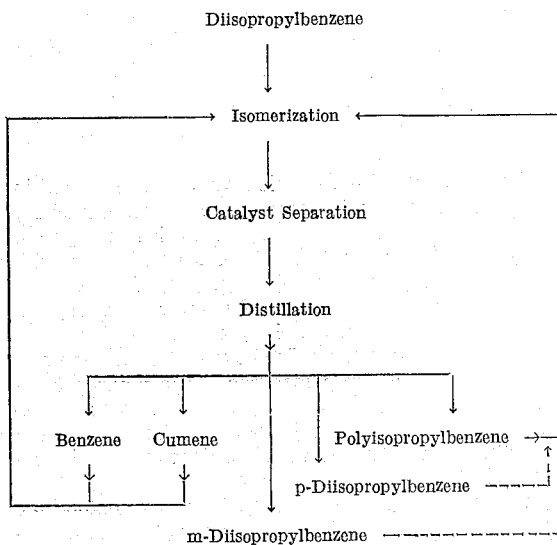

The diisopropylbenzene introduced into the system must be free of trimethylindane and must, therefore, have been produced by a process which precludes its presence. It may be made, for instance, by contacting propylene with benzene or cumene in the presence of sulfuric acid at any temperature below sulfonation temperatures or in the presence of less than 2 mole percent aluminum chloride at temperatures below about 65° C. or by any other process that does not produce a mixture containing trimethylindane.

The isomerization conditions for the process of this invention are critical. The catalyst is anhydrous aluminum chloride. The amount of catalyst is the amount required for isomerization but less than 2 mole percent since larger amounts effect ring closure between adjacent isopropyl radicals in o-diisopropylbenzene with formation of trimethylindane when the temperature is that required for the isomerization. Thus, the aluminum chloride must be used in the range of 0.1 to 2 mole percent (preferably 0.3 to 0.8 mole percent) based on the diisopropylbenzene starting material or the moles of isomerization products.

The isomerization temperature likewise is critical in that a temperature of at least 65° C. is required to produce the desired high yield of m-diisopropylbenzene and a temperature above 115° C. will favor formation of trimethylindane. For these reasons, the temperature for the isomerization reaction is kept within the range of 65–115° C. (preferably 80–115° C.).

In carrying out the process of this invention, the lower concentration of aluminum chloride catalyst in the range set forth is used with the higher temperature in the range set forth, and the higher concentration of aluminum chloride catalyst in the range set forth is used with the lower temperature in the range set forth. Thus 0.1 mole percent aluminum chloride used at a reaction temperature of 115° C. and 2 mole percent of aluminum chloride used at a reaction temperature of 65° C. will produce in either case a mixture of m- and p-diisopropylbenzene substantially free of o-diisopropylbenzene and trimethylindane from which m- and p-diisopropylbenzene are separable in substantially pure form.

The reaction time is that required for isomerization to reach a stage in which a substantial amount of m-diisopropylbenzene is formed and any o-diisopropylbenzene that might have been present originally has substantially disappeared. The optimum time is that at which equilibrium has been attained. The time in general is within the range of one minute to one hour. Prolonged isomerization is undesirable in the presence of the larger amounts of catalyst and the higher temperature range.

By the process of this invention it is thus possible to produce m-diisopropylbenzene as well as p-diisopropylbenzene from o-diisopropylbenzene or from mixtures of diisopropylbenzene isomers from which neither the m- nor the p-diisopropylbenzene is separable by physical processes, and it is also possible to convert one isomer into the other and direct the process to optimum conversion to the desired m- or p-isomer.

What I claim and desire to protect by Letters Patent is:

1. In the method of converting a diisopropylbenzene including mixtures of the isomers thereof into a mixture of m- and p-diisopropylbenzenes from which the m-diisopropylbenzene is separable in a substantially pure state by distillation, the step which comprises contacting said diisopropylbenzene substantially free of trimethylindane with 0.1 to 2 mole percent of the reaction mixture of aluminum chloride at a temperature in the range of 65–115° C. until the reaction mixture is substantially free of o-diisopropylbenzene.

2. The method of preparing a diisopropylbenzene of the group consisting of m- and p-diisopropylbenzene substantially free of o-diisopropylbenzene and containing no trimethylindane, which comprises contacting a diisopropylbenzene substantially free of trimethylindane with 0.1 to 2 mole percent of the reaction mixture of aluminum chloride at a temperature in the range of 65–115° C. until the reaction mixture is substantially free of o-diisopropylbenzene and is substantially enriched in the desired diisopropylbenzene isomer.

3. The method of obtaining substantially pure m-diisopropylbenzene which comprises contacting a diisopropylbenzene substantially free of trimethylindane selected from the group consisting of o-diisopropylbenzene, p-diisopropylbenzene and mixtures thereof including mixtures containing m-diisopropylbenzene with 0.1 to 2 mole percent of the reaction mixture of aluminum chloride at a temperature in the range of 65–115° C. until the reaction mixture is substantially enriched in m-diisopropylbenzene and is substantially free of o-diisopropylbenzene, and subsequently separating the m-diisopropylbenzene by distillation.

4. The method of obtaining substantially pure m-diisopropylbenzene which comprises contacting in an isomerization step a diisopropylbenzene substantially free of trimethylindane selected from the group consisting of o-diisopropylbenzene, p-diisopropylbenzene and mixtures thereof including mixtures containing m-diisopropylbenzene with 0.1 to 2 mole per cent of the reaction mixture of aluminum chloride at a temperature in the range of 65–115° C. until the reaction mixture is substantially free of o-diisopropylbenzene and is substantially enriched in m-diisopropylbenzene, separating the reaction mixture from the catalyst, subsequently distilling the reaction mixture into several fractions including one containing substantially pure m-diisopropylbenzene, and recycling at least part of the other distillation fractions containing by-products of the reaction to the isomerization step.

5. The method of obtaining substantially pure p-diisopropylbenzene which comprises contacting a diisopropylbenzene substantially free of trimethylindane selected from the group consisting of o-diisopropylbenzene, m-diisopropylbenzene and mixtures thereof including mixtures containing p-diisopropylbenzene with 0.1 to 2 mole percent of the reaction mixture of aluminum chloride at a temperature in the range of 65–115° C. until the reaction mixture is substantially free of o-diisopropylbenzene and is substantially enriched in p-diisopropylbenzene, and subsequently separating the p-diisopropylbenzene by distillation.

6. The method of obtaining substantially pure p-diisopropylbenzene which comprises contacting in an isomerization step a diisopropylbenzene substantially free of trimethylindane selected from the group consisting of o-diisopropylbenzene, m-diisopropylbenzene and mixtures thereof including mixtures containing p-diisopropylbenzene with 0.1 to 2 mole percent of the reaction mixture of aluminum chloride at a temperature in the range of 65–115° C. until the reaction mixture is substantially free of o-diisopropylbenzene and is substantially enriched in p-diisopropylbenzene, separating the reaction mixture from the catalyst, subsequently distilling the reaction mixture into several fractions including one containing substantially pure p-diisopropylbenzene, and recycling at least part of the other distillation fractions containing by-products of the reaction to the isomerization step.

7. In the method of converting a diisopropylbenzene including mixtures of the isomers thereof into a mixture of m- and p-diisopropylbenzenes from which the m-diisopropylbenzene is separable in a substantially pure state by distillation, the step which comprises contacting said diisopropylbenzene substantially free of trimethylindane with 0.3 to 0.8 mole percent of the reaction mixture of aluminum chloride at a temperature in the range of 80–115° C. until the reaction mixture is substantially free of o-diisopropylbenzene.

References Cited in the file of this patent
UNITED STATES PATENTS

| | | |
|---|---|---|
| 2,429,691 | Johnson et al. | Oct. 28, 1947 |
| 2,527,824 | Kemp | Oct. 31, 1950 |
| 2,568,209 | Wackher | Sept. 18, 1951 |
| 2,700,689 | McCauley et al. | Jan. 25, 1955 |
| 2,744,150 | Enos | May 1, 1956 |

OTHER REFERENCES

Baddeley et al.: Jour. Chem. Soc. (London), 1935, pages 303–309.

Newton: Jour. Am. Chem. Soc., vol. 65 (1943), pages 320–323.

Melpolder et al.: Jour. Am. Chem. Soc., vol. 70 (1948), pp. 935–939.